Patented Apr. 23, 1940

2,198,357

UNITED STATES PATENT OFFICE 2,198,357

BISMUTH α ETHYL-N-CAPROATE AND A PROCESS OF MAKING IT

László Vargha, Budapest, Hungary, assignor to Gedeon Richter, Budapest, Hungary

No Drawing. Application March 29, 1939, Serial No. 264,737. In Hungary October 26, 1938

2 Claims. (Cl. 260—447)

This invention relates to the production of bismuth α ethyl-n-caproate.

It is known that oil-soluble organic bismuth salts show advantageous medical properties. In the literature however only a small number of such salts has been described and it has been found that generally the organic bismuth salts are either very slightly solubles in oil or not constants enough.

Researches have proved, that the bismuth salt of the x-ethyl-caproic acid, hitherto unknown, is highly soluble in oil and shows the desired medical effects. The new compound has the following formula:

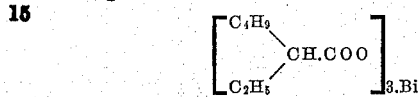

The method for preparing this compound consists in reacting the α-ethyl-n-caproic acid upon bismuth salts, whereby bismuth α-ethyl-n-caproate is formed according to the above stated formula.

Preferably the process is carried out by preparing a solution of bismuth nitrate in a mixture of glycerine and water, dissolving α-ethyl-n-caproic acid in 2n-sodium hydroxide, mixing the two solutions by stirring, dissolving the organic bismuth salt separated in chloroform, and removing the solvent by distillation.

Example 485 grams of bismuth nitrate are dissolved in a mixture of 1500 cc. of water. This solution is mixed by stirring with a solution of 432 grams of α-ethyl-n-caproic acid in 1500 cc. of 2n-sodium hydroxide. The bismuth salt separated is dissolved in 1250 cc. of chloroform and after having removed the water by the use of sodium sulphate, the solvent is removed by distillation after standing the solution for a day. The bismuth-α-ethyl-n-caproate:

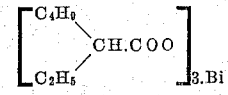

is a colourless oil, very soluble in ether and in oils. It contents 30–32% of Bi.

What I claim is:

1. A compound having the formula:

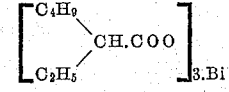

2. A process for the production of the compound according to claim 1, in which a solution of bismuth nitrate in a mixture of glycerine and water is prepared and added to a stirred solution of α-ethyl-n-caproic acid in 2n-sodium hydroxide, the organic bismuth salt separated being dissolved in chloroform, the solution being dried after standing for a day and the solvent being removed by distillation.

LÁSZLÓ VARGHA.